United States Patent [19]

Kamiyama et al.

[11] Patent Number: 4,838,638
[45] Date of Patent: Jun. 13, 1989

[54] OPTICAL WAVELENGTH CONVERSION DEVICE

[75] Inventors: Kozi Kamiyama; Yoji Okazaki, both of Kanagawa, Japan

[73] Assignee: Fuji Photo Film Co., Ltd., Kanagawa, Japan

[21] Appl. No.: 156,517

[22] Filed: Feb. 16, 1988

[30] Foreign Application Priority Data

Feb. 16, 1987 [JP] Japan ................................. 62-32914

[51] Int. Cl.$^4$ ................................................ G02B 6/34
[52] U.S. Cl. .............................. 350/96.19; 350/96.12; 350/96.15; 350/96.33; 350/96.34; 307/427
[58] Field of Search .............. 350/96.12, 96.13, 96.15, 350/96.19, 96.29, 96.33, 96.34; 307/425–430

[56] References Cited

U.S. PATENT DOCUMENTS

| | | | |
|---|---|---|---|
| 3,350,654 | 10/1967 | Snitzer | 350/96.33 |
| 3,808,549 | 4/1974 | Maurer | 350/96.15 |
| 3,822,927 | 7/1974 | Zernike | 350/96.12 |
| 3,983,406 | 9/1976 | Lax et al. | 307/425 |
| 4,070,091 | 1/1978 | Taylor et al. | 350/96.33 |
| 4,212,514 | 7/1980 | Prunier et al. | 350/96.15 |
| 4,387,953 | 6/1983 | Shirasaki et al. | 350/96.13 |
| 4,593,974 | 6/1986 | Yamamoto et al. | 350/96.34 |
| 4,763,019 | 8/1988 | Duguay et al. | 307/427 |
| 4,788,436 | 11/1988 | Koechner | 350/96.34 |

FOREIGN PATENT DOCUMENTS

| | | | |
|---|---|---|---|
| 2441858 | 7/1980 | France | 350/96.33 |
| 0250334 | 12/1985 | Japan . | |
| 1264303 | 11/1986 | Japan . | |
| 6315233 | 1/1988 | Japan . | |
| 6315234 | 1/1988 | Japan . | |
| 2180059 | 3/1987 | United Kingdom | 350/96.29 |

OTHER PUBLICATIONS

Williams; "Organic Polymeric . . . Nonlinearities"; Angew. Chem. Int. Ed. Engl. 23 (1984); pp. 690–703.

Primary Examiner—William L. Sikes
Assistant Examiner—Xuan Thi Vo
Attorney, Agent, or Firm—Sughrue, Mion, Zinn, Macpeak & Seas

[57] ABSTRACT

An optical wavelength conversion device is composed of a nonlinear optical material, and a first cladding layer having a refractive index lower than the refractive index of the nonlinear optical material and covering the nonlinear optical material, thereby to convert a fundamental wave entering the optical wavelength conversion device to a second harmonic, to guide the second harmonic through the first cladding layer, and to radiate the second harmonic. A second cladding layer formed of a material having a refractive index lower than the refractive index of the first cladding layer is provided outside of the first cladding layer, thereby to protect the first cladding layer.

4 Claims, 2 Drawing Sheets

OPTICAL WAVELENGTH CONVERSION DEVICE

BACKGROUND OF THE INVENTION

1. Field of the Invention

This invention relates to an optical wavelength conversion device for converting an optical fundamental wave entering the device to an optical second harmonic having a wavelength one half the wavelength of the fundamental wave. This invention particularly relates to an optical wavelength conversion device formed to exhibit low optical propagation loss and high durability.

2. Description of the Prior Art

Various attempts have heretofore been made to convert the wavelength of a laser beam to a shorter wavelength by utilization of optical second harmonic generation using a nonlinear optical material. As an optical wavelength conversion device for carrying out wavelength conversion in this manner, there has heretofore been known a bulk crystal type device as described in, for example, "Hikari Electronics No Kiso" (Fundamentals of Optoelectronics) by A. Yariv, translated by Kunio Tada et al., Maruzen K.K., pp. 200-204. However, the bulk crystal type optical wavelength conversion device has the drawback that double refraction by a crystal is utilized for satisfying the phase matching conditions, and therefore a material which exhibits large nonlinearity, but exhibits little or no double refraction, cannot be utilized.

As one of optical wavelength conversion devices that eliminate the aforesaid drawback, a fiber type device has heretofore been proposed. The fiber type optical wavelength conversion device is constituted by an optical fiber comprising a cladding and a core which is formed of a nonlinear optical material and which is filled inward of the cladding. Ah example of the fiber type optical wavelength conversion device is described in Bulletin of Micro Optics Research Group, Optical Meetings of The Japan Society of Applied Physics, Vol. 3, No. 2, pp. 28-32, Apr. 25 (1985). The fiber type optical wavelength conversion device has the advantage that phase matching between the fundamental wave and the second harmonic can be achieved easily, and therefore extensive research has been conducted in recent years on the fiber type optical wavelength conversion device. Also, as disclosed in, for example, Japanese Patent Application Nos. 61(1986)-159292 and 61(1986)-159293, there has heretofore been proposed an optical waveguide type optical wavelength conversion device comprising two substrates as cladding layers, and an optical waveguide formed of a nonlinear optical material and disposed between the two substrates. The optical waveguide type optical wavelength conversion device also has the aforesaid advantage.

However, the fiber type optical wavelength conversion device and the optical waveguide type optical wavelength conversion device are constituted so that the second harmonic is radiated into the cladding layer having a refractive index lower than the refractive index of the nonlinear optical material and phase matching is effected between the second harmonic and the fundamental wave advancing through the nonlinear optical material. Therefore, the fiber type optical wavelength conversion device and the optical waveguide type optical wavelength conversion device has the drawback that an optical propagation loss readily arises. Specifically, the second harmonic radiated from the nonlinear optical material into the cladding layer advances to an edge face of the optical wavelength conversion device by repeating total reflection. In the case where, for example, flaws or foreign substances are present on the surface of the cladding layer or a device supporting means contacts the surface of the cladding layer, the total reflection conditions are not satisfied at the surface of the cladding layer. As a result, the second harmonic escapes out of the surface of the cladding layer, or is scattered by that surface.

SUMMARY OF THE INVENTION

The primary object of the present invention is to provide an optical wavelength conversion device wherein the optical propagation loss is minimized.

Another object of the present invention is to provide an optical wavelength conversion device which exhibits a high durability and little deterioration with the passage of time.

The present invention provides an optical wavelength conversion device composed of a nonlinear optical material, and a first cladding layer having a refractive index lower than the refractive index of the nonlinear optical material and covering the nonlinear optical material, thereby to convert a fundamental wave entering the optical wavelength conversion device to a second harmonic, to guide the second harmonic through the first cladding layer, and to radiate the second harmonic, wherein the improvement comprises the provision of a second cladding layer formed of a material having a refractive index lower than the refractive index of said first cladding layer, said second cladding layer being formed outside of the first cladding layer.

In the case where the second cladding layer is provided outside of the first cladding layer, there is no risk of the first cladding layer directly contacting foreign substances, a device supporting means or the like, and therefore total reflection of the second harmonic is not obstructed by the foreign substances, the device supporting means or the like. Also, damaging of the surface of the first cladding layer is minimized. In the case where the second cladding layer is formed of a material having a refractive index lower than the refractive index of the first cladding layer, the second harmonic is totally reflected by the boundary between the two cladding layers, and can advance through the first cladding layer.

With the optical wavelength conversion device in accordance with the present invention wherein the surface of the first cladding layer is prevented from clinging of foreign substances, damaging and contacting the device supporting means, escape of the second harmonic from the optical wavelength conversion device and scattering of the second harmonic can be eliminated, and the optical propagation loss can be minimized. Also, since there is no risk of the device supporting means contacting the surface of the first cladding layer, the optical wavelength conversion device may be supported and positioned in any manner, and a device using the optical wavelength conversion device can be constituted more freely. Also, since the second cladding layer is provided, the optical wavelength conversion device in accordance with the present invention has an increased physical strength and a high durability and exhibits little deterioration with the passage of time.

In the case of general optical fibers, there has heretofore been known an optical fiber comprising a cladding and a cover layer formed outside of the cladding. As disclosed in, for example, Japanese Unexamined Patent Publication No. 61(1986)-264303, the cover layer is formed of a material having a refractive index higher than the refractive index of the cladding, thereby to radiate propagated light, which is radiated from a core to the cladding, out of the cladding. Thus the cover layer is different in structure and effects from the second cladding layer of the optical wavelength conversion device in accordance with the present invention.

The refractive indices of the first cladding layer and the second cladding layer will hereinbelow be described in detail by taking, as an example, the case of Cherenkov radiation where the first cladding layer and the second cladding layer are substantially thick with respect to the wavelengths of the fundamental wave and the second harmonic. As shown in FIG. 2, a fiber type optical wavelength conversion device comprising a core 11, a first cladding layer 12 and a second cladding layer 13 is considered, and the refractive indexes of the core 11, the first cladding layer 12 and the second cladding layer 13 are denoted respectively by n1, n2 and n3. Also, the refractive index of the first cladding layer 12 with respect to the fundamental wave is denoted by $n_2^\omega$, the refractive index of the first cladding layer 12 with respect to the second harmonic is denoted by $n_2^{2\omega}$, and the refractive index of the second cladding layer 13 with respect to the second harmonic is denoted by $n_3^{2\omega}$. When the angle of the optical wave with respect to the fiber axis is denoted by $\theta$ as shown in FIG. 2, the total reflection conditions at the boundary between the first cladding layer 12 and the second cladding layer 13 are expressed as $$\sin \alpha > n_3^{2\omega}/n_2^{2\omega}.$$

Since $\alpha + \theta = \pi/2$, $$\sin[(\pi/2) - \theta] > n_3^{2\omega}/n_2^{2\omega}$$

$$\therefore \cos \theta > n_3^{2\omega}/n_2^{2\omega}.$$

Therefore, the maximum value $\theta_0$ that the angle $\theta$ can attain within the range of effecting the total reflection is expressed as $$\theta_0 = \cos^{-1}(n_3^{2\omega}/n_2^{2\omega}) \quad (1)$$

When the effective refractive index is denoted by neff, the phase matching conditions by Cherenkov radiation are expressed as $$n_2^{2\omega} \cos \theta = n\text{ eff}.$$

$$n_2^\omega < n \text{ eff} < n_2^{2\omega}.$$

Therefore, the maximum value $\theta_1$ that the angle $\theta$ can attain under said phase matching conditions is expressed as $$\theta_1 = \cos^{-1}(n_2^\omega/n_2^{2\omega}) \quad (2)$$

Accordingly, the conditions under which total reflection can occur and, at the same time, the second harmonic can be guided through the first cladding layer 12 are expressed as $$\theta_1 < \theta_0 \quad (3)$$

Formulas (1), (2) and (3) reduce to $$\cos^{-1}(n_2^\omega/n_2^{2\omega}) < \cos^{-1}(n_3^{2\omega}/n_2^{2\omega}).$$

$$\therefore n_2^\omega > n_3^{2\omega} \quad (4)$$

Formula (4) indicates that the total reflection of the second harmonic and the phase matching between the second harmonic and the fundamental wave can be effected in the case where the refractive index dispersion curves of the first cladding layer 12 and the second cladding layer 13 become, for example, as indicated by "a" and "c" in FIG. 3, instead of becoming as indicated by "a" and "b", and the refractive index $n_2^\omega$ of the first cladding layer 12 with respect to the fundamental wave having a wavelength $\lambda_2$ is higher than the refractive index $n_3^{2\omega}$ of the second cladding layer 13 with respect to the second harmonic having a wavelength $\lambda_1 (= \lambda_2/2)$.

DESCRIPTION OF THE PREFERRED EMBODIMENTS

The present invention will hereinbelow be described in further detail with reference to the accompanying drawings.

Figure 1:
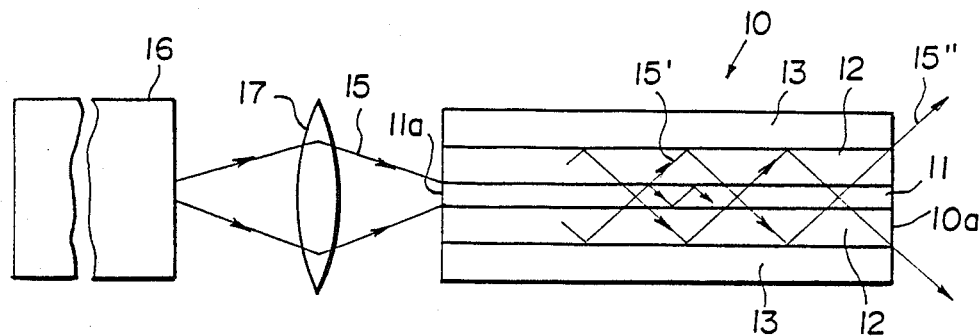
FIG. 1 is a schematic side view showing an embodiment of the optical wavelength conversion device in accordance with the present invention.
Figure 2:
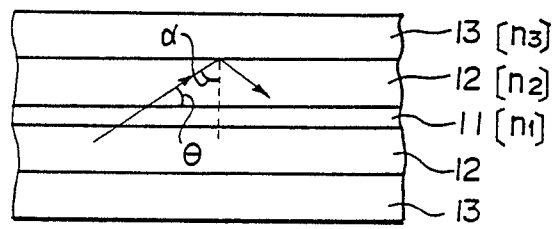
FIG. 2 is an explanatory view showing the total reflection conditions and the phase matching conditions for the second harmonic in the optical wavelength conversion device in accordance with the present invention.
Figure 3:
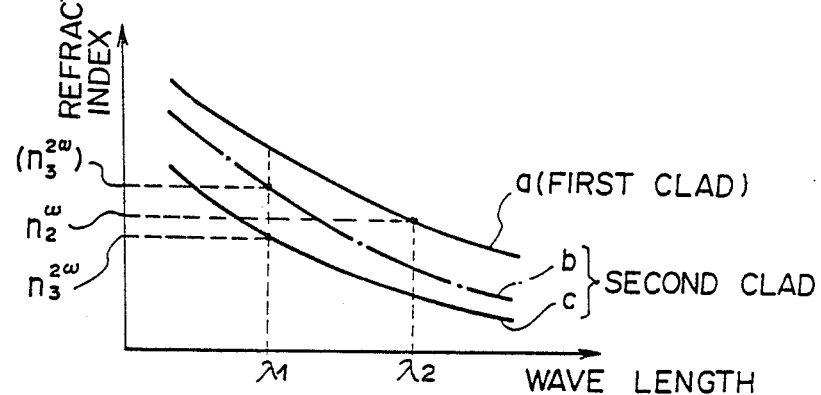
FIG. 3 is a graph showing the refractive index dispersion curves of the first cladding layer and the second cladding layer in the optical wavelength conversion device in accordance with the present invention.

With reference to FIG. 1, an optical wavelength conversion device 10 is constituted by an optical fiber comprising a first cladding layer 12 and a core 11 formed of a nonlinear optical material and filled in a hollow region at the center of the first cladding layer 12. As the nonlinear optical material, an organic nonlinear optical material having a nonlinear optical constant markedly larger than that of an inorganic material should preferably be used. As the organic nonlinear optical material, it is possible to use, for example, 2-methyl-4-nitroaniline (MNA), methanitroaniline (mNA), 3-methyl-4-nitropyridine-1-oxide (POM), or urea as disclosed in Japanese Unexamined Patent Publication No. 60(1985)-250334; "Nonlinear Optical Properties of Organic and Polymeric Materials", ACS SYMPOSIUM SERIES 233, David J. Williams, American Chemical Society, 1983; and "Yuki Hisenkei Kogaku Zairyo" (Organic Nonlinear Optical Materials), Masao Kato, et al., CMC K.K., 1985. For example, MNA has a wavelength conversion efficiency approximately 2,000 times the wavelength conversion efficiency of $LiNbO_3$ as an inorganic nonlinear optical material. Therefore, in the case where the core 11 is formed by use of the organic nonlinear optical material, a laser beam having a short wavelength, in the blue region, can be obtained by generating a second harmonic from an infrared laser beam emitted as the fundamental wave from a popular small and low-cost semiconductor laser. On the other hand, the first cladding layer 12 is formed of a material having a refractive index lower than the refractive index of the aforesaid nonlinear optical material. A second cladding layer 13 formed of a material having a refractive index lower than the refractive index of the first cladding layer 12 is formed outside of the first cladding layer 12.

Figure 4:
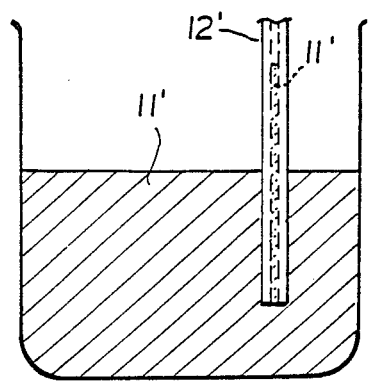
FIG. 4 is a schematic view showing the method of making the optical wavelength conversion device shown in FIG. 1.

The method of making the optical wavelength conversion device 10 will hereinbelow be described with reference to FIG. 4 by taking the case where the core 11 is formed of MNA, the first cladding layer 12 is formed of pyrex glass, and the second cladding layer 13 is formed of polytrifluoroisopropyl methacrylate, as an example. First, a hollow glass fiber 12' for forming the first cladding layer 12 is prepared. By way of example, the glass fiber 12' has an outer diameter of approximately 100 μm, and a diameter of the hollow region is in a range of approximately 2 μm to 10 μm. Then, MNA 11' is kept in a melt condition in a furnace or the like, and one end of the glass fiber 12' is dipped in the molten MNA 11'. As a result, the molten MNA 11' enters the hollow region of the glass fiber 12' by capillary action. In order to prevent the molten MNA 11' from decomposing, the temperature of the molten MNA 11' is kept at a value slightly higher than its melting point (132° C.). Thereafter, the glass fiber 12' is quenched to convert the MNA 11' in the hollow region into a polycrystalline condition.

The glass fiber 12' should more preferably be gradually drawn from the furnace maintained at a temperature higher than the melting point of the MNA 11', with a temperature outside the furnace being maintained at a temperature lower than said melting point, thereby to convert the molten MNA 11' to the single crystal condition at the draw-out region to the exterior of the furnace. In this manner, the core 11 consisting of the MNA in the markedly long single crystal condition having a uniform crystal orientation is formed, and therefore the optical wavelength conversion device 10 can be made substantially long. As is well known, the wavelength conversion efficiency of the optical wavelength conversion device of this type is proportional to the length of the optical wavelength conversion device, and the practical value of the optical wavelength conversion device increases as the length thereof increases.

After the core 11 is filled in the hollow region of the glass fiber 12' in the manner as mentioned above, polytrifluoroisopropyl methacrylate is applied to the surface of the glass fiber 12', thereby to form the second cladding layer 13. By way of example, the formation of the second cladding layer 13 is carried out by dissolving 20 g of polytrifluoroisopropyl methacrylate in 1 liter of methyl ethyl ketone to prepare a coating solution, applying the coating solution to the surface of the glass fiber 12', and drying the coating solution applied on the surface of the glass fiber 12'. Then, the glass fiber 12' is cut at both ends to an appropriate length, and the optical wavelength conversion device 10 as shown in FIG. 1 is obtained.

The optical wavelength conversion device 10 is used in the manner as shown in FIG. 1. Specifically, a fundamental wave 15 is made to enter the core 11 from a core edge face 11a. A Q-switch YAG laser (wavelength: 1.06 μm) 16 is used as the fundamental wave generating means, and a laser beam (fundamental wave) 15 guided by an objective lens 17 is made to impinge upon the core edge face 11a, thereby to make the laser beam 15 enter the optical wavelength conversion device 10. The fundamental wave 15 is converted by the MNA constituting the core 11 to a second harmonic 15' having a wavelength one half the wavelength of the fundamental wave 15. The second harmonic 15' advances inside of the optical wavelength conversion device 10 by repeating total reflection among the outer surface regions of the first cladding layer 12. By way of example, phase matching is effected between the guided mode of the fundamental wave 15 through the core and the radiation mode of the second harmonic 15' to the first cladding layer 12 (in the case of Cherenkov radiation).

A beam 15" including the second harmonic 15' is radiated out of a radiation edge face 10a of the optical wavelength conversion device 10. The radiated beam 15" is passed through a filter (not shown), and the second harmonic 15' alone is thus taken up for usage.

Refractive indexes n1, n2 and n3 of the MNA, pyrex glass and polytrifluoroisopropyl methacrylate respectively constituting the core 11, the first cladding layer 12 and the second cladding layer 13 will now be described below. By way of example, the refractive indices with respect to the YAG laser beam having the wavelength of 1.06 μm and the second harmonic having a wavelength of 0.53 μm obtained therefrom are as shown below.

|    | Wavelength 1.06 μm | Wavelength 0.53 μm |
|----|--------------------|--------------------|
| n1 | 1.496              | —                  |
| n2 | 1.464              | 1.475              |
| n3 | 1.41               | 1.42               | where the value of n1=1.496 is the effective refractive index. In this case, Formula (4) mentioned above is satisfied since $n_2^\omega=1.464$ and $n_3^{2\omega}=1.42$. Accordingly, the total reflection of the second harmonic 15' and the aforesaid phase matching can be effected.

Also, in the case where the aforesaid second cladding layer 13 is provided, the surface of the first cladding layer 12 is prevented from clinging of foreign substances, direct contact of a device supporting means, and damaging. Also, by the provision of the second cladding layer 13, the physical strength of the optical wavelength conversion device 10 becomes high.

Figure 5:
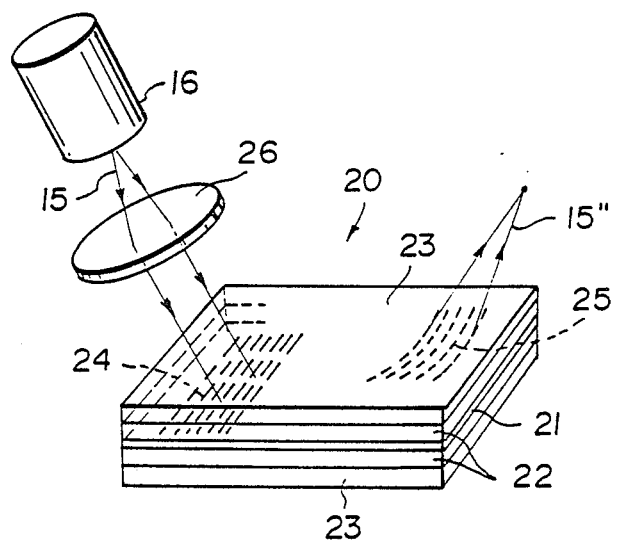
FIG. 5 is a schematic perspective view showing another embodiment of the optical wavelength conversion device in accordance with the present invention.

Another embodiment of the optical wavelength conversion device in accordance with the present invention will hereinbelow be described with reference to FIG. 5. An optical wavelength conversion device 20 shown in FIG. 5 is of the optical waveguide type, and comprises glass substrates 22, 22 as the first cladding layers, and an optical waveguide 21 formed therebetween by filling a nonlinear optical material. Also, second cladding layers 23, 23 are respectively formed on the outer surfaces of the glass substrates 22, 22. The optical waveguide 21, the glass substrates 22, 22, and the second cladding layers 23, 23 may be formed respectively of the aforesaid MNA, pyrex glass and polytrifluoroisopropyl methacrylate. Also, filling of the MNA between the glass substrates 22, 22 and the formation of the second cladding layers 23, 23 may be carried out basically in the same manner as mentioned above with reference to the first embodiment. The method of forming the optical waveguide by filling the nonlinear optical material between the glass substrates 22, 22 is described in detail in, for example, Japanese Patent Application Nos. 61(1986)-159292 and 61(1986)-159293.

In order to enter the fundamental wave into the optical waveguide type optical wavelength conversion device 20, the fundamental wave may be made to directly impinge upon the device edge face in the same manner as mentioned with reference to the embodiment shown in FIG. 1. However, in the embodiment shown in FIG. 5, entry of the fundamental wave and radiation of the second harmonic are effected by use of grating couplers. Specifically, a linear grating coupler (hereinafter referred to as LGC) 24 for entry of the fundamental wave is formed on the inner surface of the upper glass substrate 22 in FIG. 5, i.e. on the surface thereof facing the optical waveguide 21. Also, a focusing grating coupler (hereinafter referred to as FGC) 25 for radiation of the second harmonic is formed on the outer surface of the upper glass substrate 22 in a substantially spaced relation to the LGC 24.

Effects of the optical wavelength conversion device 20 having the aforesaid configuration will be described below. By way of example, the aforesaid YAG laser 16 is used as the fundamental wave generating means, and the laser beam (fundamental wave) 15 guided by a collimator lens 26 is made to impinge upon the LGC 24 via the second cladding layer 23 and the glass substrate 22. In this manner, the laser beam 15 can be entered to the optical waveguide 21. The second harmonic is produced from the laser beam 15 as the fundamental wave, and the light beam 15" including the second harmonic is radiated out of the FGC 25 on the second cladding layer 23 and is converged to a single spot.

Also with the optical wavelength conversion device 20 shown in FIG. 5 wherein the second cladding layers 23, 23 are formed outside of the glass substrates 22, 22, the same effects as the provision of the second cladding layer 13 in the optical wavelength conversion device 10 shown in FIG. 1 can be obtained.

In the aforesaid embodiments, MNA is used as the nonlinear optical material, and the effective refractive index thereof with respect to the fundamental wave having a wavelength of 1.06 μm is adjusted to 1.496. In the case where the effective refractive index changes in accordance with differences in orientation of the single crystal and the kind of the nonlinear optical material, the first cladding layer and the second cladding layer having suitable refractive indices should be selected. Specifically, the cladding glasses constituting the first cladding layer and having various refractive indices may be employed. As the second cladding layer, instead of polytrifluoroisopropyl methacrylate, it is also possible to employ a resin material such as a melamine resin, a polyester resin, an acrylic resin, a silicone resin, an epoxy resin, a polyvinyl chloride resin, a polyethylene resin, a polypropylene resin, a polyamide resin, an acetyl cellulose resin; glass such as silica glass; or a transparent oxide crystal such as $Al_2O_3$.

We claim:

1. An optical wavelength conversion device composed of an organic nonlinear optical material, and a first cladding layer disposed outside the nonlinear optical material and having a refractive index lower than the refractive index of the organic nonlinear optical material and covering the organic nonlinear optical material, thereby to convert a fundamental wave entering the optical wavelength conversion device to a second harmonic, to guide the second harmonic through the first cladding layer, and to radiate the second harmonic, wherein the improvement comprises a second cladding layer formed of a material having a refractive index lower than the refractive index of said first cladding layer, said second cladding layer being formed outside said first cladding layer, wherein the refractive index $n_2^\omega$ of said first cladding layer with respect to said fundamental wave and the refractive index $n_3^{2\omega}$ of said second cladding layer with respect to said second harmonic satisfy the relationship expressed as $n_2^\omega < n_3^{2\omega}$.

2. A device as defined in claim 1 wherein said organic nonlinear optical material is filled between a pair of said first cladding layers having a refractive index lower than the refractive index of said nonlinear optical material, and a pair of said second cladding layers formed of a material having a refractive index lower than the refractive index of each of said first cladding layers are formed outside said first cladding layers.

3. A device as defined in claim 2 wherein at least one of said first cladding layers is provided with one of a grating for entry of said fundamental wave, which is formed on an inner surface facing said organic nonlinear optical material and a grating for radiation of said second harmonic, which is formed on an outer surface opposite said inner surface.

4. A device as defined in claim 3 wherein said grating for radiation of said second harmonic is a focusing grating coupler.

* * * * *